July 24, 1956 R. E. FOX 2,755,915
WORK FEEDING MECHANISM FOR MACHINE TOOLS
Filed May 6, 1952 2 Sheets-Sheet 1
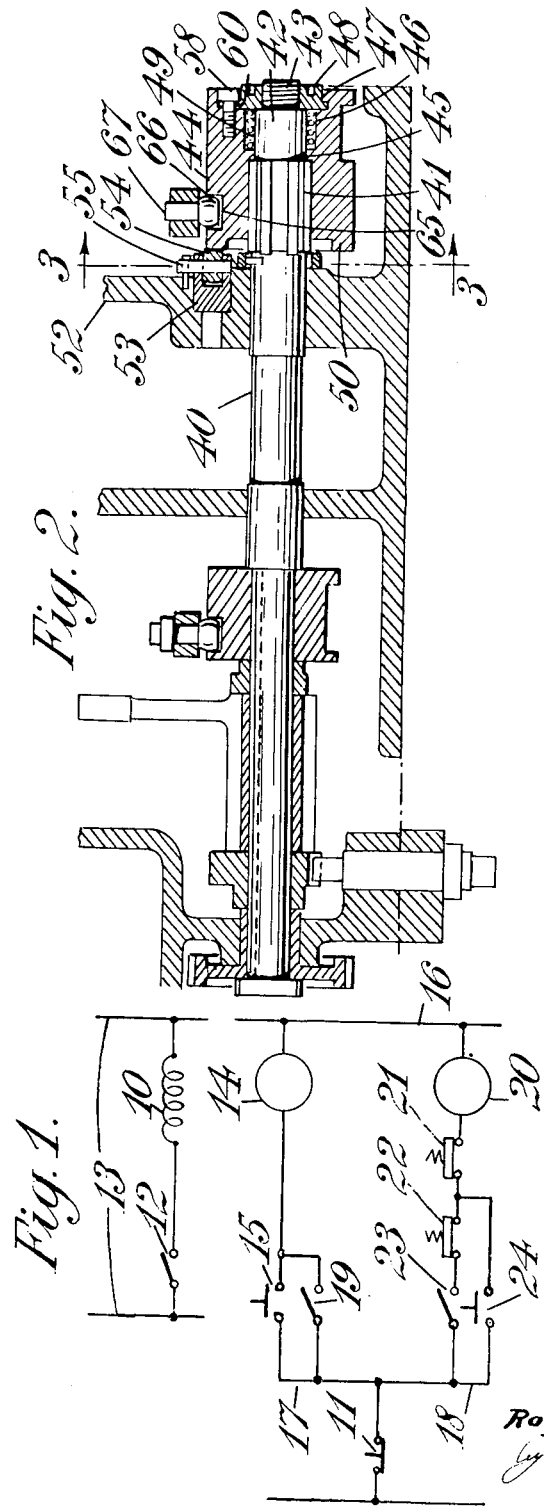
Inventor
Roy Elwin Fox July 24, 1956

R. E. FOX 2,755,915

WORK FEEDING MECHANISM FOR MACHINE TOOLS

Filed May 6, 1952

Inventor
Roy Elwin Fox
by Hooper, Leonard & Glenn
his Attorneys

United States Patent Office 2,755,915
Patented July 24, 1956

2,755,915
WORK FEEDING MECHANISM FOR MACHINE TOOLS

Roy Elwin Fox, Hove, England, assignor to C. V. A. Jigs, Moulds & Tools Limited, Hove, England, a British company Application May 6, 1952, Serial No. 286,399

Claims priority, application Great Britain May 18, 1951

10 Claims. (Cl. 203—12)

This invention relates to work feeding mechanism for machine tools and has for an object to provide a simple means of stopping the mechanism when the work is exhausted. The machine tool is of the kind in which the cycle of operations including the feeding of the work is controlled by one or more cam shafts or the like, which are driven from the motor.

According to this invention, a machine tool of the kind referred to above is characterised in that an electric circuit is arranged to control the drive transmitted from the motor to the work feed mechanism, which electric circuit embodies a switch mechanism which is controlled by the movement of an element conditioned by the presence or absence of the work in the feeding mechanism.

The aforesaid motor may be arranged to drive a cam shaft, operating the feeding mechanism, through an electro-magnetic clutch, which is controlled by said switch mechanism.

A transmission between the cam shaft and a part of the feeding mechanism which engages the work, embodies a spring loaded mechanism which may be released when the cam has rotated into a position for feeding the work, but is maintained in its loaded condition as long as the work is engaged by the feeding mechanism, but is released should no work be present, and in moving operates the said switch mechanism.

In one construction according to this invention a cam controlling the movement of the feed mechanism is axially movable on its driving shaft and at one limit of its movement maintains a spring in a loaded condition which cam is held at that limit by a trip mechanism which is released at the time when the cam is in a position ready to effect the feed of the work, and the transmission between the cam and the element which feeds the work is such as to maintain the spring loaded so long as the work is present, although it has been released by the mechanism but releases the spring when there is no work present in the feeding mechanism, the resulting axial movement of the cam being arranged to operate the switch mechanism.

The trip mechanism may comprise a recess in an end face of the cam, which face co-operates with a projection on a fixed part of the mechanism, which projection can enter the recess when the cam is in a position to effect feeding movement of the work.

The following is a more detailed description of the invention as applied to a work feed cam shaft, which operates work feed mechanism, such as that described in the specification of application Serial No. 288,587, filed May 19, 1952, in the name of William Elias Reginald Pulman, reference being made to the accompanying drawing in which:

Figure 1 is an electric circuit diagram showing an arrangement of switches for controlling an electric magnetic clutch in the work feed transmission, Figure 2 is a part plan and part cross-section of the cam and cam shaft which operates the work feed mechanism and also controls one of the electric switches.

Figure 3:
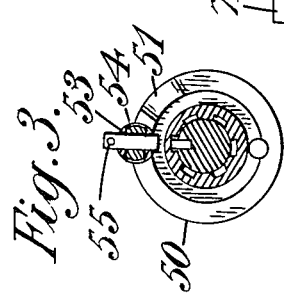
Figure 3 is a section on the line 3—3 of Figure 2.

The cam shaft 40 (Figure 2) is provided with splines 41 towards one end thereof, and is reduced in diameter at 42 beyond the splines and is screw-threaded at its extremity 43. A barrel cam 44 is provided with a groove 65 which is engaged by a roller 66 at the end of a lever arm 67. The lever arm is mounted on a pivot 72 adjustable both along it and along a lever arm 69 pivoted at 73, the swinging movement of which latter lever is restrained by a tension spring, as described in the aforesaid application Serial No. 288,587. The movement of the lever arm 67 imparts axial movement to a work feed tube 68. The feed tube is provided with fingers 70 which grip the work 71 and feed it forward. The barrel cam is provided with a splined bore for engaging the splines 41 on the cam shaft 40 and is also provided with an inwardly directed flange 45 which separates the splined bore from a smooth bore 46. The diameter of the smooth bore is such as to leave an annular space between it and the reduced portion of the cam shaft. The outer end face of the barrel cam is provided with a recess 47 and located within the recess is a nut 48 which engages the threaded extremity of the cam shaft. A helical compression spring 49 is arranged in the annular space between the nut 48 and the aforesaid inwardly directed flange 45. The inner end face of the barrel cam is provided with a projecting annular face 50, a portion of which is cut away to provide a recess 51 (Figure 3). Mounted in a fixed part 52 of the frame of the machine opposite the aforesaid annular face is a carrier 53 (Figure 2) for a roller 54, which latter may engage the face 50. The roller 54 is mounted on a spindle 55 arranged radially with respect to the cam shaft. With this arrangement, the aforesaid helical spring 49 tends to press the annular face 50 against the roller 54 so that the whole of the cam 44 is moved by the spring axially when the recess 51 in the face 50 is disposed opposite the roller. Mounted also in a fixed part of the machine opposite the annular face is a plunger 63 (Figure 4) which operates an electric switch 22. The plunger is urged by a spring 64 towards the end face of the cam, but is spaced away therefrom as long as the roller is in engagement with the annular face. As soon as the cam moves axially due to the roller 54 entering the recess 51, the annular face 50 engages the plunger 63 and opens the switch. So long as there is a bar opposite the feeding mechanism the cam 44 does not move axially, although the recess may be opposite the roller, since the force of the spring 49 is not sufficient to effect a feeding movement nor to overcome the frictional engagement of the feed fingers with the bar. In certain instances, the switch may not be required to be operated when there is no bar present, and in such circumstances, axial movement of the cam is prevented by means of a set screw 58 (Figure 2) which engages a threaded hole 59 in the outer end face of the cam 44 and the head of the set screw engages a flange 60 on the nut.

Figure 4:
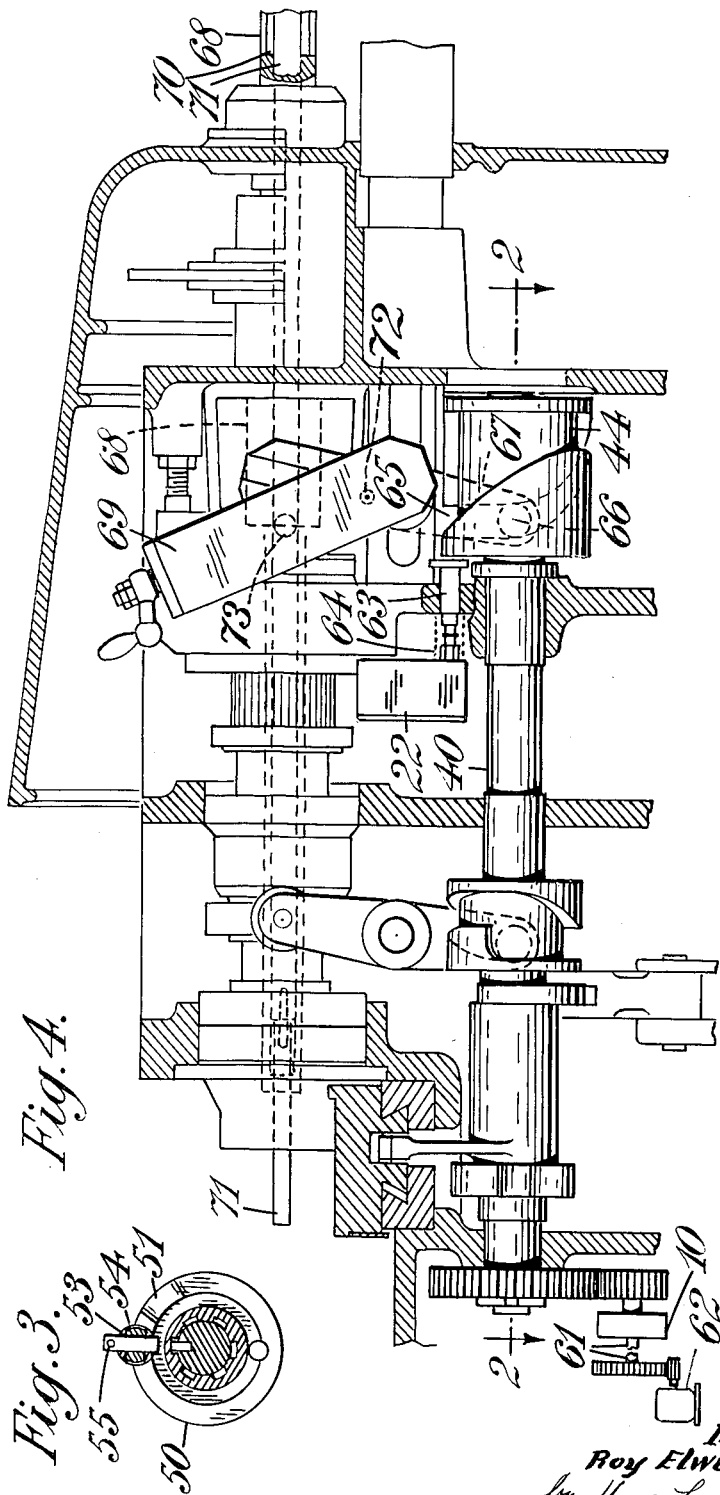
Figure 4 is an elevation of the arrangement shown in Figure 2.

As already indicated, the stop switch 22 controls an electro-magnetic clutch indicated diagrammatically at 10 in Figures 1 and 2, through which the cam shaft 40 is driven from the back shaft of the lathe indicated diagrammatically at 61 in Figure 4 which is driven by a motor 62. Certain other switches are provided which control the energisation of the clutch coil, as shown diagrammatically in Figure 1 of the accompanying diagrammatic drawing.

The clutch coil is indicated at 10, and the aforesaid stop switch at 22. As will be seen, the clutch coil is connected in series with a switch 12 across the supply mains 13. The switch 12 is controlled by a relay 14 which is connected in series with an inching switch 15 (i. e. a switch which remains closed only so long as it is actuated by hand and returns to the open position when released) between a conductor 17 and one side 16 of the supply mains. The stop button 11 of a self-opening switch is connected between this conductor 17 and the other side 18 of the supply main. The inching switch 15 is bridged by a switch 19 controlled by another relay 20 which in its turn is connected between the conductor 17 and one side 16 of the mains in series with the two switches 21, 22 and a switch 23, also controlled by the relay 20. The switch 22 and the switch 23 are bridged by a start switch 24.

The operation is as follows. On closing the inching switch 15 a circuit is established with the relay coil 14 and this closes the switch 12 thereby energising the clutch coil 10. Upon opening the inching switch the relay coil 14 is de-energised, the switch 12 opens and the clutch coil 10 is de-energised. On the other hand, upon closing the starting switch 24 the relay coil 20 is energised and the energising circuit is maintained by reason of the switch 23 being closed by the relay coil. At the same time, the relay coil 20 closes the switch 19 thereby energising the relay coil 14 which in its turn closes the switch 12 energising the clutch coil, which will remain energised as long as the relay 20 is operative.

As already indicated, included in the circuit with the relay coil 20 are switches 22 and 21, and if either of these switches is opened the circuit to the relay coil 20 is interrupted causing the switch 19 to be opened, thus de-energising the relay coil 14 opening the switch 12, thereby de-energising the clutch coil. The limit switch 21 is operated when the machine drive is overloaded and the switch 22 is opened by the bar feed cam when the stock is exhausted, since the aforesaid roller 54 will enter the recess 51. Either of these conditions result in the de-energising of the clutch coil 10. The relay coil 20 is provided with the maintaining switch 23 and this ensures that when the relay coil 20 is de-energised by the opening of either of the switches 21 and 22, the reclosing of these switches does not result in the re-energising of the coil 20. This also applies to the operation of the stop button 11. It may happen that after the switch 22 has opened the machine will stop leaving the switch 22 open. In this case, the circuit would be left open between the switches 23 and 22 and it is for that reason the start switch 24 is connected so as to bridge these two switches and enables the clutch coil to be re-energised.

I claim:

1. In a machine tool with a driving motor, the combination of work-feeding mechanism comprising a gripper adapted to be advanced to feed the work and thereafter to be retracted along it in frictional engagement therewith, and means for advancing and retracting the gripper which means comprise a cam shaft, a transmission connecting the cam shaft with the driving motor, a cam axially movable on the cam shaft, means preventing relative rotation between the cam and the cam shaft, a spring urging the cam in an axial direction, a follower for the cam, a transmission connecting the cam follower with the gripper whereby the spring is maintained in a loaded condition by the frictional grip of the gripper on the work, detent means for holding the spring in a loaded condition, means for releasing said detent means, means for operating said releasing means upon rotation of the cam into a position for feeding the work thereby permitting release of the spring and axial movement of the cam in the absence of work engaged by the gripper, an electro-magnetic clutch in the first said transmission, and a switch controlling said clutch, axial movement of the cam under the action of the spring operating said switch.

2. In a machine tool with a driving motor, the combination as claimed in claim 1 in which the electro-magnetic clutch is connected in circuit with an electric source of supply, and there are provided a switch in said circuit between the clutch and the source of supply, and a relay controlling said switch, which relay is energised under the control of the first-said switch.

3. In a machine tool with a driving motor, the combination as claimed in claim 2 in which one side of said relay is connected to one side of the source of supply, and an inching switch is provided through which the other side of the relay is connected to the other side of the supply.

4. In a machine tool with a driving motor, the combination as claimed in claim 3 in which a switch is provided bridging the inching switch and a second relay is provided controlling the bridging switch.

5. In a machine tool with a driving motor, the combination as claimed in claim 4 in which the second relay is connected on one side direct to one side of the source of supply and is connected on the other side to the other side of the supply through the first-said switch.

6. In a machine tool with a driving motor, the combination as claimed in claim 5 in which a limit switch is provided connected in series with the first-said switch.

7. In a machine tool with a driving motor, the combination as claimed in claim 6 in which a maintaining switch is provided arranged in series with the first-said switch, which maintaining switch is maintained closed by the second relay so long as that relay is energised.

8. In a machine tool with a driving motor, the combination as claimed in claim 7 in which a start switch is provided bridging the maintaining switch and the first-said switch.

9. In a machine tool with a driving motor, the combination as claimed in claim 8 in which the inching switch, the switch controlled by the second relay, the maintaining switch and the start switch are connected to one side of the supply through a stop switch.

10. In a machine tool with a driving motor, the combination as claimed in claim 1 in which the detent means comprise a fixed projection and an end of the cam, which end is engaged by the projection and is provided with a recess, whereby when the projection registers with the recess in the absence of work engaged by the gripper the cam moves axially under the action of the spring.

References Cited in the file of this patent

UNITED STATES PATENTS

| | | |
|---|---|---|
| 537,898 | Mettler | Apr. 23, 1895 |
| 915,173 | Hanson | Mar. 16, 1909 |
| 1,001,409 | Jennings | Aug. 22, 1911 |
| 2,369,466 | Kylin et al. | Feb. 13, 1945 |
| 2,669,345 | Brown | Feb. 16, 1954 |